United States Patent [19]

Wolfson

[11] Patent Number: 5,104,213
[45] Date of Patent: Apr. 14, 1992

[54] POLYMER BUTTONS HAVING HOLES THEREIN AND CONTACT LENSES MANUFACTURED THEREFROM AND METHOD OF MANUFACTURE

[76] Inventor: Leonard G. Wolfson, 15 Varick Rd., Waban, Mass. 02168

[21] Appl. No.: 462,767

[22] Filed: Jan. 10, 1990

Related U.S. Application Data

[63] Continuation-in-part of Ser. No. 297,834, Jan. 17, 1989, abandoned.

[51] Int. Cl.⁵ .......................... G02C 7/04; B23K 26/00
[52] U.S. Cl. .............................. 351/160 R; 219/121.7; 219/121.71; 351/160 H; 351/177
[58] Field of Search ............... 351/160 R, 160 H, 161, 351/162, 177; 219/121.7, 121.71

[56] References Cited

U.S. PATENT DOCUMENTS

| | | | |
|---|---|---|---|
| 3,833,786 | 9/1974 | Brucker | 351/160 R X |
| 4,068,933 | 1/1978 | Seiderman | 351/160 R |
| 4,194,814 | 3/1980 | Fischer et al. | 351/160 R |
| 4,466,705 | 8/1984 | Michelson | 351/160 H X |
| 4,709,996 | 12/1987 | Michelson | 351/160 H X |
| 4,886,350 | 12/1989 | Wichterle | 351/160 H |

Primary Examiner—Scott J. Sugarman
Attorney, Agent, or Firm—Samuels, Gauthier & Stevens

[57] ABSTRACT

An apertured polymer button in which that portion of the button which is machined and polished to produce a contact lens contains holes having a diameter of 40 to 60 microns and allow the passage through the finished lens of fluids and/or holes having a diameter of 5 to 25 microns and allow the passage through the finished lens of gases such as oxygen and carbon dioxide but not fluids.

23 Claims, 1 Drawing Sheet

POLYMER BUTTONS HAVING HOLES THEREIN AND CONTACT LENSES MANUFACTURED THEREFROM AND METHOD OF MANUFACTURE

CROSS-REFERENCE TO RELATED APPLICATION

This application is a continuation-in-part application of U.S. Ser. No. 297,834 filed 17 Jan. 1989 now abandoned.

Field of the invention

This invention pertains to a polymer button having holes or openings. Specifically, this invention pertains to a polymer button which contains holes which button may be machined or lathed to form a contact lens which allows the transport of gases such as oxygen and carbon dioxide to a greater extent than a lens formed from a polymer button of the same chemical composition but devoid of openings.

Description of the prior art

The machining of polymer buttons or disks to produce contact lenses is old art and has been practiced for many decades. The buttons are generally cut from rods of solid polymer which have been prepared by extrusion or polymerization in a suitable, usually cylindrical mold or are cut or punched from sheets of polymer.

The buttons may be cylindrical and have straight vertical sides or may have a collar, depending upon the holder which is to be used to hold the button during the lathing, machining and/or polishing operation.

Hard or rigid contact lenses have traditionally been lathed from buttons containing poly(methyl methacrylate), referred to as PMMA. In addition to the PMMA homopolymer, copolymers containing a crosslinking monomer for greater rigidity and solvent resistance, as well as other comonomers have also been used in the preparation of buttons for conversion to hard contact lenses. While the inexpensive lenses comprising PMMA or its copolymers provided excellent vision correction, they caused a significant portion of the lens-wearing population to suffer from edema, i.e. redness or swelling of the eye, due to the very low oxygen permeability of the lens, and an increased corneal thickness.

While silicone rubber lenses (U.S. Pat. No. 3,228,741) were highly permeable to oxygen, they were poor optical devices and, due to their hydrophobicity, they were poorly wettable by tears and were very uncomfortable to wear. Further, they were prepared directly by casting rather than from buttons since they could not be machined or polished.

Soft hydrophilic lenses based on hydrated poly(hydroxyethyl methacrylate) (HEMA) (U.S. Pat. No. 3,220,960) have provided improved oxygen permeability by virtue of their water content. The usual procedure for the preparation of soft HEMA lenses involves either direct polymerization in a mold or rotational casting, although in some instances, the hard product produced by polymerization to a rod or button has been subjected to lathing. In either case, the shaped polymer is subjected to hydration, e.g. by soaking in saline solution, to form the soft lens. The latter is a poor optical device and is characterized by the accumulation and absorption of harmful compounds and pathological organisms, the necessity of special handling and treatment because of the high water content and difficulties in correcting astigmatic vision and other eye problems. In addition, they scratch and tear more easily than PMMA lenses. Further, a significant portion of the population still suffers from edema when wearing these soft lenses.

The invention of the rigid gas permeable (RGP) lens based on the copolymerization of polysiloxanylalkyl acrylic esters (U.S. Pat. Nos. 3,808,178; 4,120,570 and Re-issue 31, 406) has overcome the edema problem. This hard, rigid copolymer is usually produced in the form of rods which are cut into buttons and lathed and polished, i.e. the same techniques used traditionally with PMMA, to form an oxygen permeable contact lens which is also an excellent optical device. However, the polysiloxanyl monomer which is responsible for the oxygen permeability is extremely expensive and a relatively high concentration is required to provide the desired gas permeability. As the concentration of the polysiloxanyl monomer is increased, the rigidity is reduced and the wettability by tears is decreased.

Copolymers of perfluoroalkyl acrylic esters and other fluorine-containing copolymers (U.S. Pat. Nos. 3,808,179; 3,950,315) in the form of buttons are machinable to form oxygen permeable contact lenses. However, these compositions have some of the same deficiencies as those from the polysiloxanyl acrylic esters, i.e. as the concentration of fluorine-containing monomer is increased to increase the oxygen permeability, the rigidity is decreased.

Although changes in chemical composition have resulted in the preparation of buttons which may be lathed and polished to form contact lenses which are more permeable than PMMA, the resultant products possess other deficiencies as mentioned hereinbefore.

Mechanical techniques have been used to form apertures, fenestrations, openings, passageways, etc. in contact lenses to permit fluids to act upon the surface of the lens or to allow fluids and gases to pass through the lens.

U.S. Pat. No. 4,211,476 discloses that a single small hole or aperture drilled in the peripheral lens region where it floats on a tear film inhibits the rotation of the lens which generally occurs during a blink cycle. The presence of the hole results in stabilization of the vertical orientation of the lens. U.S. Pat. Reissue 29,229 discloses that holes may be drilled in a hard contact lens to permit transport of tears and oxygen to the cornea.

Mechanical drilling of a hard contact lens leaves an opening with sharp edges and microscopic burrs, necessitating additional polishing. U.S. Pat. No. 4,621,912 discloses that with suitable electrodes, passageways having conically tapered end portions which diverge inwardly and join in an enlarged middle section, may be pierced electrically in a soft or hard contact lens. These passageways allow both the passage of tear fluid which removes sloughed-off epithelial cells and metabolic wastes and supplies oxygen to the eye.

Laser beams have been used to form openings in hard contact lenses. However, the openings have elevations of plastic at the hole edges, necessitating repolishing. U.S. Pat. No. 3,971,910 discloses an apparatus for perforating a contact lens using a laser beam. The lens is supported on a motor-driven shaft which is synchronized with the operation of the laser so that the contact lens is rotated on the shaft as the laser beam is periodically energized to produce a plurality of openings in a ring through the lens. The procedure reportedly reduces the height of the elevations at the hole edges.

U.S. Pat. No. 4,666,267 discloses that soft contact lenses may be perforated by either pressing a punch perpendicularly to the outer surface when the lens is in a swollen state or by drilling through a dried lens. It is noted that, since the soft lens adheres almost perfectly to the eye surface, the tear liquid is not changed in the thin liquid film between the surface of the cornea and the lens. The opening allows the passage of tear fluid containing metabolites from the surface of the cornea through the lens.

U.S. Pat. No. 4,353,849 discloses a method for producing molded soft contact lenses so as to provide molded-in hemispherical air vents or passageways in peripheral locations about the inner surface. Hydrophilic lens material in the form of a cylinder is machined to form the inner surface of the lens. The machined part is heated and a die is used to create impressions in the lens inner surface which provide the vent passageways. The cylindrical form is then machined to provide the outer or external lens surface. The vents or channels on the inner surface permit the passage of tears and oxygen from the outer edge of the central corneal section of the lens.

U.S. Pat. Nos. 4,435,050 and 4,540,417 disclose contact lens assemblies which consist of a lens element, preferably made of optical glass, fitted to and centrally supported by a haptic structure which comprises two thin sheets of plastic material laminated to the lens element and to each other and having substantial fenestration so as to possess longitudinally open passages which permit air access to the lens covered regions of the cornea.

The prior art citations described hereinbefore disclose either polymer compositions which act as membranes and permit gases to permeate through the contact lens or methods for providing openings in materials conventionally used in the preparation of contact lenses so as to permit the passage of tear fluid as well as the oxygen which is soluble in the aqueous fluid. The tear fluid contains epithelial cells and other metabolites which must be transported away from the cornea. It is noted in U.S. Pat. No. 4,666,267 that soft contact lenses require openings to allow fluid passage through the lens because the lens adheres perfectly to the eye surface and the tear liquid is not changed in the thin liquid film between the surface of the cornea and the lens. It is further noted in U.S. Pat. No. 4,666,267 that hard lenses do not adhere so perfectly to the eye and permit a relatively good exchange of tear liquid under the lenses during an eye movement. Therefore, an opening may not be necessary for the passage of fluid through a hard lens.

It has been noted that apertures or openings provided for fluid transport become clogged with cells and waste products, resulting in discomfort. The present invention provides for an apertured lens which permits the passage of gases such as oxygen and carbon dioxide but not liquids.

The prior art citations describe the preparation of perforated or apertured contact lenses by means of devices and methods which are applied to individual contact lenses. In normal practice, the lens technician or mechanic machines or lathes a button, prepared by others who are skilled in the arts of polymerization or extrusion, to provide optical surfaces which are then polished to yield the finished contact lens. Under the prior art teachings, the mechanic would then have to use special equipment so as to subject the finished lens to the appropriate method of perforation and fenestration in order to equip the lens with apertures, followed by repolishing.

The more useful and desirable approach to an apertured contact lens involves the preparation of a button having holes therein which is supplied to the lens maker who then proceeds in the usual manner to prepare a lathed and polished lens which has apertures by virtue of its precursor holed button.

Japan Kokai Tokyo Koho JP 81,111,625 (Chemical Abstracts, 96, 11716 (1982)) discloses the preparation of a perforated disk or button which is useful in the manufacture of contact lenses. The disks are prepared by polymerizing monomer in a plastic cylindrical container containing a number of polyvinyl chloride (PVC) fibers stretched from end to end. The polymerized product, e.g. PMMA, is removed from the cylinder and sliced to obtain disks containing pieces of PVC fibers to obtain a perforated disk.

Although this procedure yields perforated buttons, it is necessary that the hole size permit the entrance and passage of solvent to remove the fibers. Since the objective of the present invention is the preparation of buttons which have sections which are intended to become contact lenses, wherein such sections have holes that do not allow the entrance and/or passage of liquids, this prior art procedure is not applicable.

SUMMARY OF THE INVENTION

An object of the present invention is to provide a polymer button which may be machined and polished to form a contact lens which is comfortable to wear without the development of edema.

Another object of the present invention is to provide a polymer button which may be machined and polished to form a contact lens which contains apertures which allow for the transmission of gases such as oxygen and carbon dioxide therethrough but prevents the passage of the aqueous tear fluid to and from the surface of the cornea through the lens.

A further objective of the present invention is to provide a polymer button which may be machined and polished to form a contact lens which contains a first set of apertures which allows for the transmission of gases such as oxygen and carbon dioxide therethrough but which prevent apertures the passage of the aqueous tear fluid to and from the surface of the cornea as well as a second set of apertures which permits the passage of the tear fluid through the lens.

It has now been found that these improvements in a polymer button may be achieved by placing in that portion of the button which is machined to form a contact lens, holes having a diameter of at least 40 microns and/or holes having a diameter of less than about 25 microns.

Broadly the invention comprises a button for the manufacture of contact lenses and the lenses manufactured therefrom wherein the lens formed contains one or more apertures having a diameter of between 1-20 microns. In a preferred embodiment of the invention, the button which is formed into the lens contains a first set of apertures which have a diameter of between 5-25 microns as well as a second set of apertures which have a diameter of between 40-60 microns.

DETAILED DESCRIPTION OF THE PREFERRED EMBODIMENT

The conventional polymer button made from PMMA and other polymers and used in the manufacture of contact lenses is generally about 3-7 mm thick and has a diameter of about 12-16 mm. The button has the same dimensions whether the polymer is uncrosslinked or crosslinked PMMA. Although various techniques may be used to form holes in the button, the important requirement in accordance with this invention, is that the openings, in that portion of the button which becomes the finished lens, have the proper diameter.

In one embodiment of this invention, the apertures in the lens have a diameter of about 5-25 microns so as to permit the passage of gases but not of liquids.

In another embodiment of this invention, there are 40-60 micron apertures in the lens which permit the passage of tear fluids, in the central area, surrounded by 5-25 micron apertures which permit the passage of gases but not of liquids, in the peripheral area.

Although a lens containing the small apertures which permit the passage of gases but not liquids provides in some patients, a considerable improvement in comfort, as compared with an unapertured lens, in other patients the improvement is not adequate.

Unexpectedly, it has been found that the presence of both larger and smaller apertures, in an array with the larger apertures in the central portion of the lens surrounded by the smaller apertures, provides for greater accessibility to oxygen, clearer vision and more comfort than either large or small apertures alone.

Figure 1:
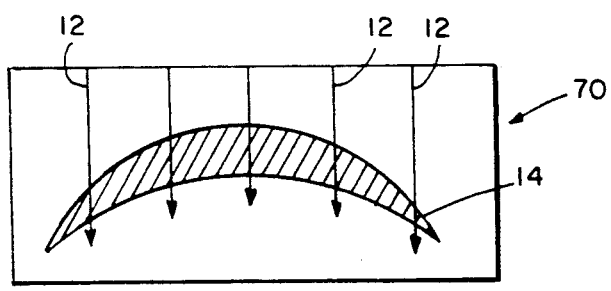
FIG. 1 is a side view of a button wherein the hatched area represents the portion to be machined into a contact lens and the vertical lines represent the holes made into the button and through the hatched lens area.

The number of 40-60 micron holes in the center of that section of the button which becomes the center of the lens, may range from 2 to 100 holes. The number of 5 to about 25 micron holes in that section of the button which surrounds the central area and becomes the corresponding peripheral area in the finished lens, may range from 2 to 200 holes. As shown in FIG. 1, a polymer button 10 has holes 12 drilled therein (represented by the arrows). The hatched area 14 represents the area to be machined into a lens. The arrangement of the holes may be varied to a considerable extent without loss of the characteristics which result from their number and size.

Figure 2:
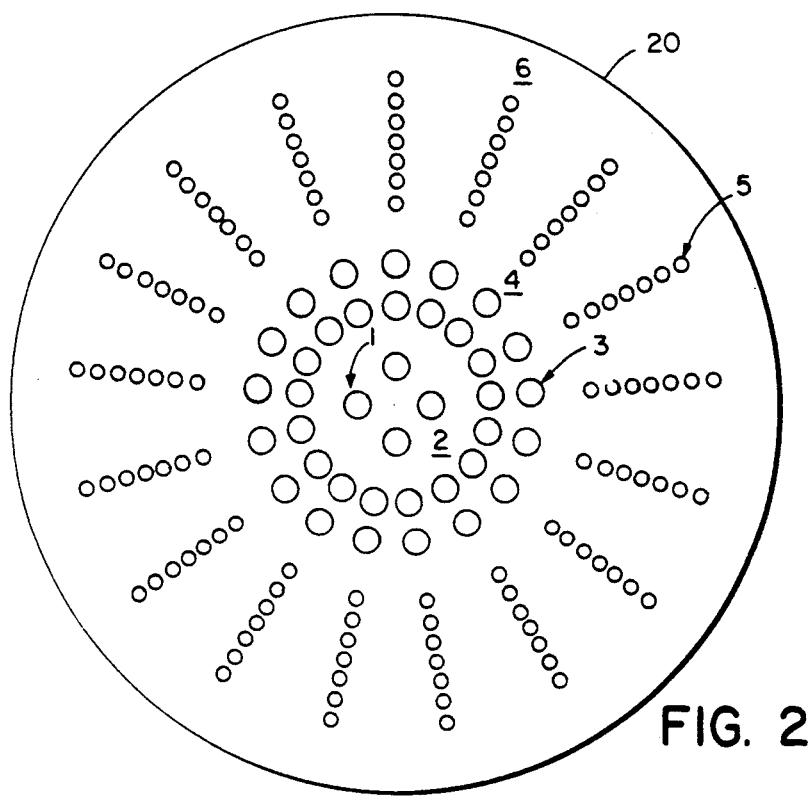
FIG. 2 is a top view of a button wherein the circular holes represent the holes in that portion of the button to be machined into a contact lens.

In one arrangement, depicted in FIG. 2, a button 20 is shown having four center holes 22a-22d, each having a diameter of 40-60 microns uniformly arrayed one (1) mm center to center. The holes 22a-22d are surrounded by two rows of holes 24 and 26, each row containing seventeen holes having the same or a slightly smaller diameter, e.g. 40-45 microns spaced one (1) mm center to center and the row 24 is about one (1) mm from the holes 22. Seven additional rows of holes 28, 30, 32, 34, 36, 38 and 40, each row containing seventeen holes having a diameter of about 18-22 microns, are located in the area between the two rows which surround the central holes and that portion of the button which becomes the edge of the finished lens. These holes are about 0.5 mm center-to-center.

The lens prepared from the perforated button will have seventeen arrays of 9 apertures per array plus four center apertures. The distances between the center holes and the first row of larger holes between the second row of larger holes and the first row of smaller holes and between the last row of small holes and the edge of the lens, may be varied without an appreciable effect on the lens characteristics and the patient's comfort. The spacing between holes in any of the rows may be uniform or non-uniform. The spacing between adjacent rows may also be uniform or non-uniform. The number of arrays, the number of rows and the number of holes per row may be varied without departing from the teachings of this invention.

Figure 3:
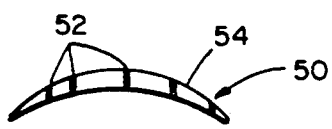
FIG. 3 is a side view of a lens made from a holed button.
Figure 4:
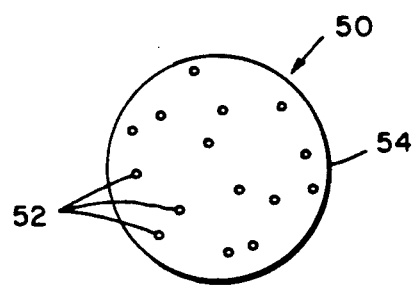
FIG. 4 is a top view of the lens of FIG. 3.

FIG. 3 is a side view of a lens 50, formed from a holed button, having random larger central apertures 52 and random smaller peripheral apertures 54. FIG. 4 is a top view of FIG. 3.

As indicated hereinbefore, the 40-60 micron apertures permit the passage of liquid, e.g. tear fluid, while the apertures having a diameter of about 25 microns or less, permit the passage of air, oxygen and carbon dioxide but not of liquids. In the absence of the smaller holes, the larger holes which provide for liquid transport become clogged with cells and waste products, resulting in discomfort and a reduction in the amount of oxygen available for cell metabolism. In the absence of the larger holes, the smaller holes which provide for gas transport remain open but tear liquid accumulates under the center of the lens.

Although the exact mechanism is uncertain, it is postulated that air containing oxygen enters through the small apertures and forces the tear fluid under the lens through the large apertures in the center of the lens to the outer surface of the lens, thus keeping the large apertures free of cells and debris. The overall effect is a pumping action in which air enters the small aperture at the periphery of the lens flows between the inner surface of the lens and the cornea and exits through the large apertures to the outer surface of the lens, causing the tear fluid with the debris contained therein to flow through the large apertures to the outer surface of the lens, resulting in greater comfort, less edema and clearer vision.

Holes may be produced in the buttons by numerous procedures including laser techniques, ion milling, electrical discharge or other drilling or hole generating procedures, provided they produce buttons having holes of the desired size in the appropriate portion of the button from which lenses are machined.

Pulsed UV excimer lasers operating at 193 nm, 222 nm, 248 nm and 308 nm are particularly effective and have been used to form holes both partially and completely through buttons made of PMMA and other transparent materials suitable for use in contact lens manufacture. The holes in the lens area of the button must have dimensional stability under the conditions of machining and the polishing encountered in the manufacture of the contact lens and the wearing and maintenance, e.g. cleaning, thereof.

In addition to PMMA, buttons made of materials which are inherently oxygen-permeable have also been subjected to the laser drilling operation to increase the oxygen permeability of the lenses made therefrom. In addition, as noted hereinbefore, in a polysiloxanylalkyl methacrylate copolymer, as the siloxanyl content is increased, the oxygen permeability increases but the rigidity decreases. However, by using a lower siloxanyl content copolymer, the rigidity is increased and the oxygen permeability is retained or increased by the placement of 1 to 20 micron holes in that area of the button which becomes the contact lens. Similar results have been obtained with fluorine-containing copolymers including perfluoroacrylic ester, fluoroalkyl ether and fluoroalkylsiloxane polymers.

As the water content in a soft hydrophilic copolymer, e.g. a HEMA or glycidyl methacrylate copolymer or a vinylpyrrolidone copolymer, is increased, the oxygen permeability increases but the fragility and surface softness also increase. The equilibrium water content is determined by the copolymer composition, e.g. comonomer content including the crosslinking comonomer. By the placement of apertures of the size herein disclosed, in a harder copolymer, having a lower equilibrium water content, after hydration, the oxygen permeability may be made equivalent to that of a higher water content material while retaining the durability of the harder copolymer.

Pulsed UV excimers operating at 193 nm, 222 nm and 248 nm create acceptable holes, free of charring and melted debris, in PMMA. Other lasers may be used, particularly when other polymers are used. The optimum wavelengths for laser drilling are dependent upon the nature of the copolymer and are readily ascertained by one skilled in the art.

The laser pulses are approximately 20 ns in duration and range from 100 to 200 MJ per $cm^2$. The laser energy is said to "wave guide" through the material thereby creating holes of very high length to diameter ratios.

The holes are formed by imaging a metal stencil having holes in it, which is located within the laser beam at the object plane of the UV transmitting lens system which can consist of one or more fused silica or other UV transmitting lenses. The lens system must be capable of resolving holes of less than 10 microns to more than 50 microns in diameter at the image plane.

The button to be drilled is placed at the image plane of the UV transmitting lens system. A single hole or an array of holes may be drilled simultaneously. The button may be repeatedly repositioned within the image plane of the UV transmitting lens to provide the desired hole pattern. More than one button may be drilled in parallel or more than one part of the button may be drilled in parallel with any other part of the button.

The entrance holes in the button range from below 250 to above 750 microns in diameter. The entrance hole diameters imaged onto the buttons are determined by the lens system demagnification factor and the metal stencil hole diameters. Typical demagnification ratios are less than 20 times.

Prior art suggests lower energy densities of less than $2J/cm^2$ to drill holes through plastics in order to have entrance holes free of melting and deformation. The resultant etch rates from these lower energy densities have depths of less than one micron per pulse.

The technique disclosed herein uses higher laser target energy densities, in the range of above 5 to greater than 20 $J/cm^2$. At the material-dependent optimum wavelength, this energy level achieves etch rates greater than 1 to 2 microns per pulse.

The resultant entrance hole melting in the button is not detrimental to the quality of the contact lens because in the machining process to produce the lens, the entrance hole in the button is discarded. The contact lens is formed from material located within the button in a region where the holes are of high quality, i.e. holes free of cracking and heat-affected areas around their side walls, and the ends of the holes in the lens are polished, in the usual manner.

The holes can be round or of a wide variety of geometric shapes. These shapes are created by using different metal stencils, with other hole shapes, or by taking advantage of the wave guiding nature of the laser light. Notwithstanding their shape, the small set of holes in the lens portion of the button must be of a size not to permit the passage of liquid.

The holes can be drilled partially through the button in order to increase the rate of production, provided that the holes pass through that portion of the button which will be ground into the contact lens and are of the desired diameter for that portion of the button.

By orienting the contact lens curvature towards or away from the entrance holes side of the button, the holes need only be drilled to a depth passing through the lens portion of the button. The central holes can then be drilled to a different depth than the holes positioned away from the center of the contact lens, thereby minimizing the total drilling time per button. This arrangement is illustrated in FIG. 1.

Since hole taper is known to be reduced at higher laser energy densities, the hole size through a finished contact lens can be adjusted by controlling the laser energy density and the entrance size of the hole in the button. The laser pulse rate can be varied from less than 1 Hz to a maximum limit dependent upon the type of material to be drilled and its tolerance for heat input. The laser pulse rate can be operated at the maximum level providing acceptable, high quality holes. Any combination of energy density and pulse repetition rate can be used to maximize production provided one maintains acceptable, high quality holes of the desired diameter. The number of holes in the button and, consequently, in the contact lens prepared therefrom, may range from as few as 10 to as many as 1000.

A patient who was unable to wear hard PMMA lenses, soft hydrophilic HEMA lenses or rigid gas permeable polysiloxanyl acrylic ester lenses for more than 2 hours before discomfort made removal of the lenses necessary, was fitted with hard apertured PMMA lenses having 20 micron diameter apertures around the periphery of the lenses, prepared from holed buttons in accordance with the present invention. The patient whose vision was corrected to 20/20 in each eye, started with a 2 hour per day wearing schedule and increased the wearing time 1 hour each day. When the wearing period reached 8 hours per day, the patient continued on an 8 hour per day schedule. After 2 weeks the patient was examined and there was no report of discomfort, the cornea was clear and there was no evidence of edema. The patient increased the wearing time to 16 hours per day and after 2 weeks the vision remained at 20/20 in each eye and no discomfort was reported. The patient commented that her vision was clear and the lenses were as comfortable at the beginning as at the end of the 16 hour wearing period.

Another patient was fitted with PMMA lenses having 136 apertures having a diameter of 15 microns around the periphery of the lenses. The patient was only able to wear these lenses for about 4 hours before developing edema and 2 hour spectacle blue in both eyes when the lenses were removed. When the patient was fitted with lenses having 150 apertures having a diameter of 20 microns around the periphery of the lenses and 4 central apertures of about 50 microns diameter, he immediately reported more comfort. The patient was able to wear these lenses comfortably for 6 hours and experienced only 20 minutes of spectacle blue upon removal of the lenses.

The foregoing is exemplary and illustrative as to methods for forming apertured polymer buttons, materials from which the buttons may be prepared and apertured contact lenses produced therefrom, but it is understood that they are not limitive and individuals skilled in the arts involved may make variations therefrom without departing from the teachings.

Having described our invention, what we now claim is:

1. A button for the manufacture of contact lenses, wherein that portion of the button which is machined to form the lens contains one or more first holes having a diameter of between 1 and 25 microns the holes in the lens so formed passing through the lens in its entirety as well as second holes which have a diameter of between 40 and 60 microns.

2. The button of claim 1 wherein the button is a polymer button.

3. The polymer button of claim 2 wherein the polymer has little or no inherent oxygen permeability.

4. The polymer button of claim 2 wherein the polymer is selected from the group consisting of methyl methacrylate homopolymer and copolymers.

5. The polymer button of claim 2 wherein the polymer is an inherently oxygen permeable polymer.

6. The polymer button of claim 5 wherein the oxygen permeable polymer is selected from the group consisting of polysiloxanylalkyl acrylic ester copolymers, fluorine-containing copolymers and fluoroalkylsiloxane polymers.

7. The polymer button of claim 2 wherein the polymer is a hydrophilic copolymer selected from the group consisting of hydroxyethyl or glyceryl methacrylate copolymers and vinylpyrrolidone copolymers.

8. The polymer button of claim 2 wherein the holes that are drilled into the button are formed by a laser.

9. The polymer button of claim 8 wherein the holes are drilled by a pulsed UV excimer laser.

10. The polymer button of claim 8 wherein the first holes in that portion of the button which is machined to form a lens have a diameter of 1 to 25 microns and the second holes have a diameter of 40 to 60 microns.

11. The polymer button of claim 1 wherein the holes which have a diameter of between 5 and 25 microns are formed in the periphery of the contact lens portion and wherein the holes which have a diameter of 40 to 60 microns are formed in the central area of the contact lens portion.

12. A contact lens containing first apertures having a diameter of 1 to 25 microns and second apertures having a diameter of 40 to 60 microns.

13. The contact lens of claim 12, wherein the lens is machined from a polymer button which has been subjected to drilling.

14. The contact lens of claim 13, wherein the polymer is selected from the group consisting of methyl methacrylate homopolymer and copolymers.

15. The contact lens of claim 13, wherein the polymer is an inherently oxygen permeable copolymer selected from the group consisting of polysiloxanylalkyl acrylic ester copolymers, fluorine-containing copolymers and fluoroalkylsiloxane polymers.

16. The contact lens of claim 13, wherein the polymer is a hydrophilic copolymer selected from the group consisting of hydroxyethyl or glyceryl methacrylate copolymers and vinylpyrrolidone copolymers.

17. A method for the preparation of gas permeable contact lenses which includes:
subjecting a polymer button to laser drilling so as to provide first holes having a diameter of 1 to 25 microns and second holes having a diameter of 40 to 60 microns in that portion of the button which is machined into a contact lens the holes in the lens so formed passing through the lens in its entirety;
machining the button to form the lens; and
polishing the lens so formed.

18. The method of claim 17 wherein the drilling is carried out with a pulsed UV excimer laser.

19. The method of claim 17 wherein the polymer is selected from the group consisting of methyl methacrylate homopolymer and copolymers.

20. A contact lens containing peripheral apertures having a diameter of 5 to 25 microns and central apertures having a diameter of 40 to 60 microns, the apertures passing through the lens in its entirety.

21. The contact lens of claim 20 wherein the lens is machined from a polymer button which has been subjected to drilling.

22. The contact lens of claim 21, wherein the polymer is selected from the group consisting of methyl methacrylate homopolymer and copolymers.

23. The contact lens of claim 21, wherein the polymer is an inherently oxygen-permeable copolymer.

* * * * *

UNITED STATES PATENT AND TRADEMARK OFFICE
CERTIFICATE OF CORRECTION

PATENT NO. : 5,104,213
DATED : Apr. 14, 1992
INVENTOR(S) : Wolfson et al.

It is certified that error appears in the above—identified patent and that said Letters Patent is hereby corrected as shown below:

On the title page, under item [19], should read --Wolfson et al.--.

On the title page, item [76], should read -- [76] Inventor: Leonard G. Wolfson, 15 Varick Rd. Waban, Mass. 02168; Leonard Eisen, 7773 Lakeside Blvd., G-193, Boca Raton, Florida 33434 --.

Signed and Sealed this

Eighth Day of December, 1992

*Attest:*

DOUGLAS B. COMER

*Attesting Officer*     *Acting Commissioner of Patents and Trademarks*